Jan. 8, 1963 S. A. SHULL 3,072,046
HIGH-SPEED PRINTER FOR COMPUTERS
Filed May 27, 1959 4 Sheets-Sheet 2
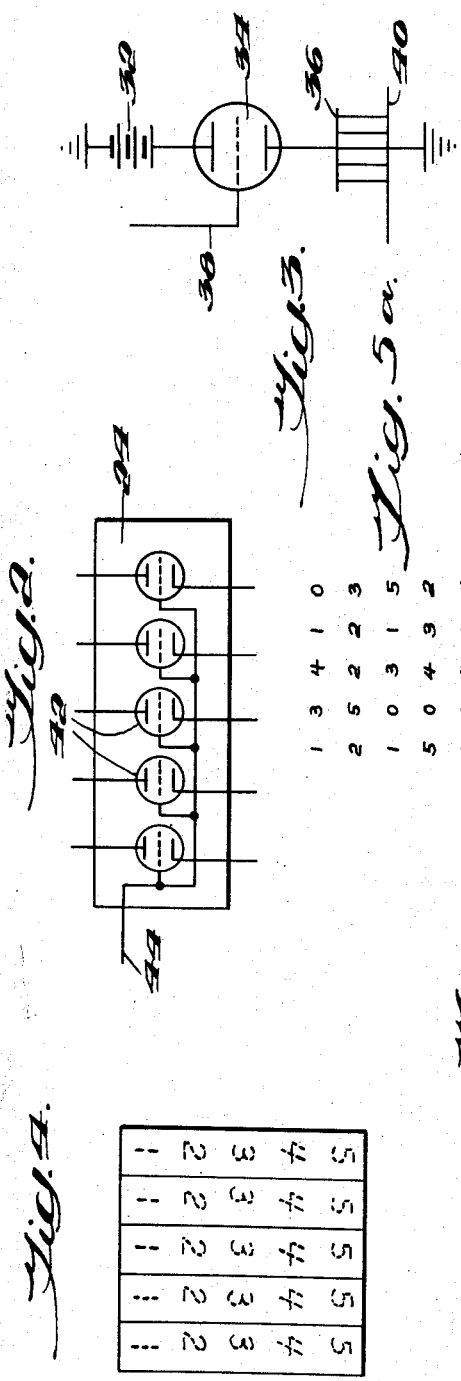
INVENTOR
STANLEY A. SHULL,
BY Bailey, Stephens & Huettig
ATTORNEYS

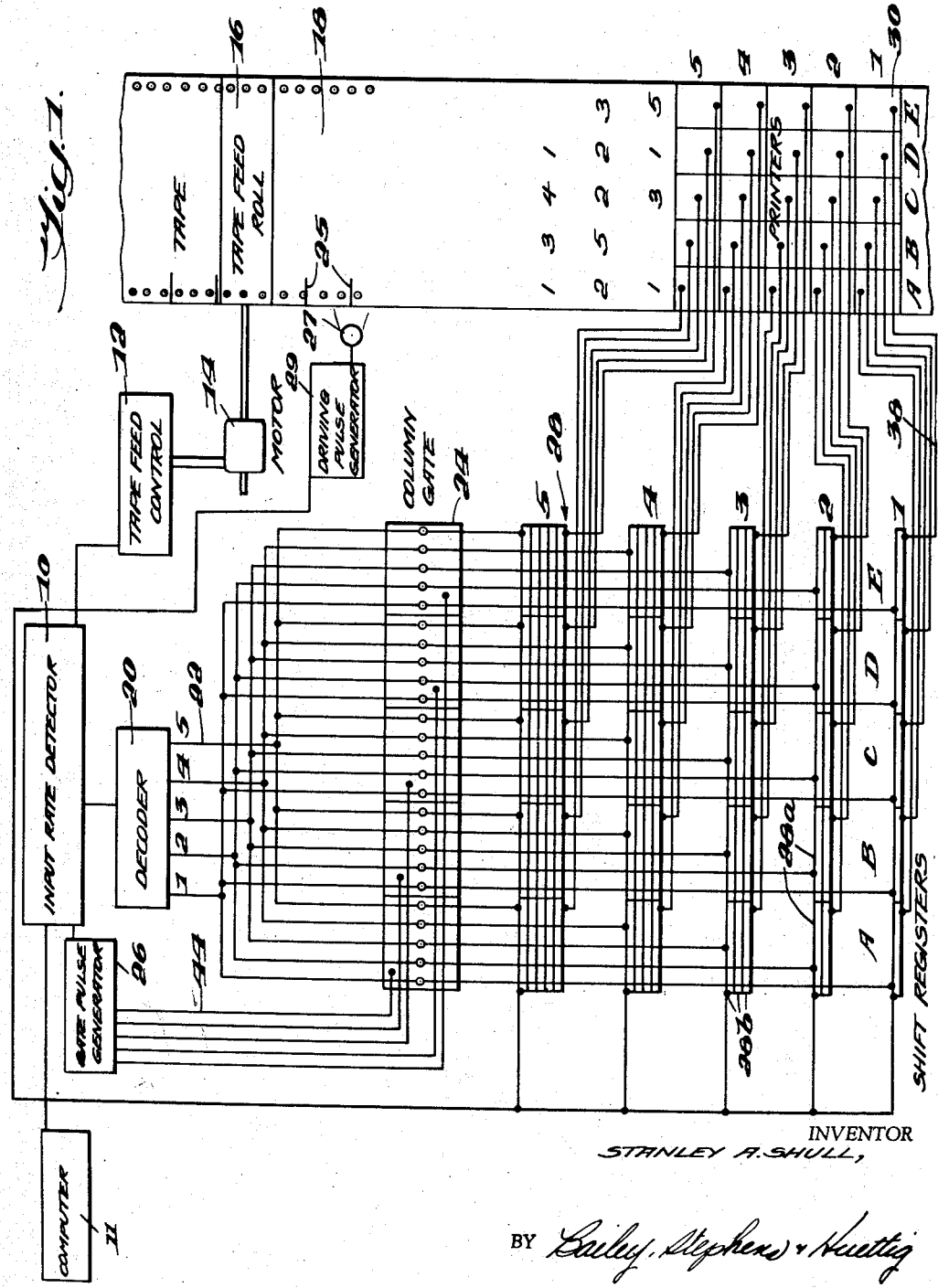

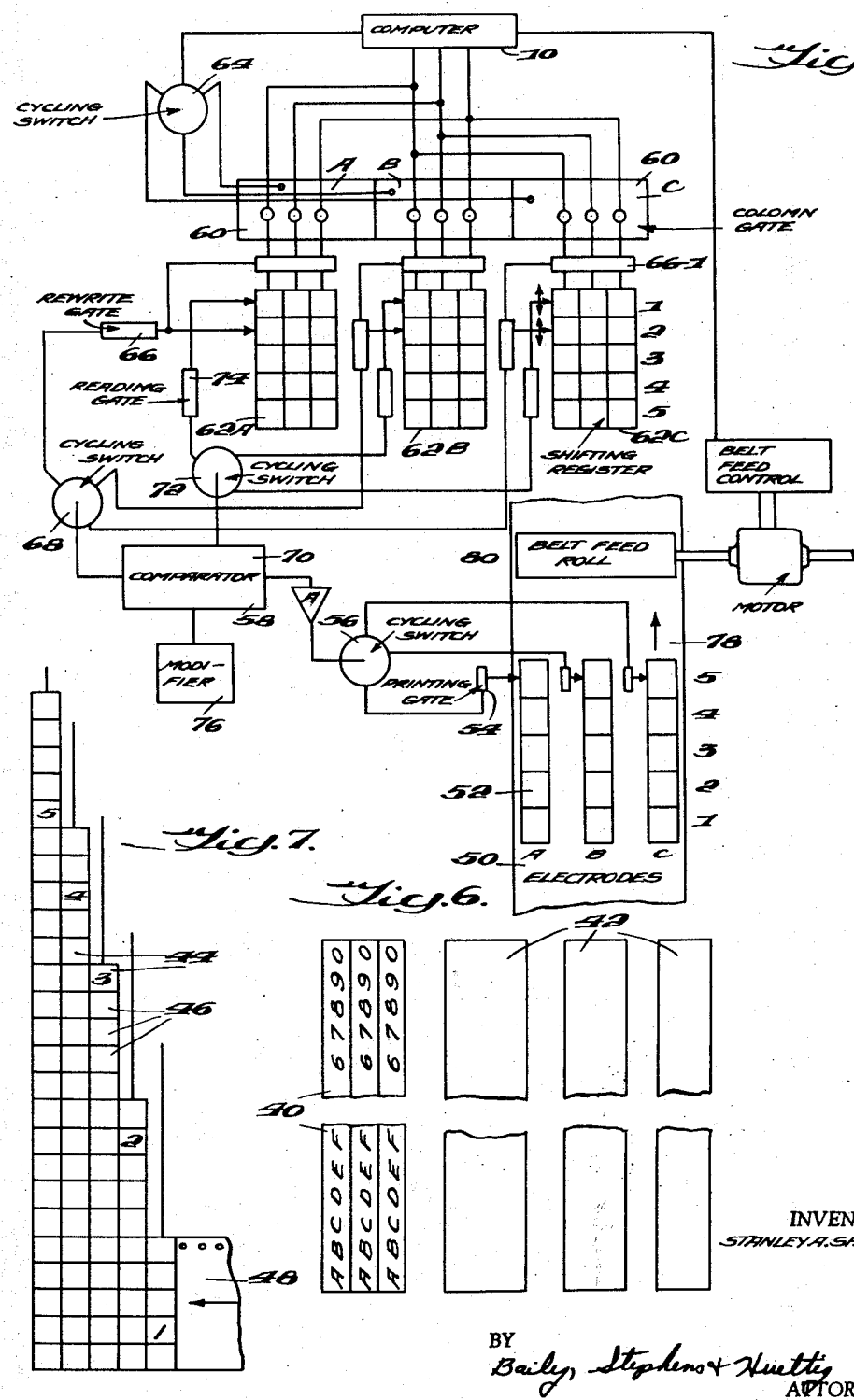

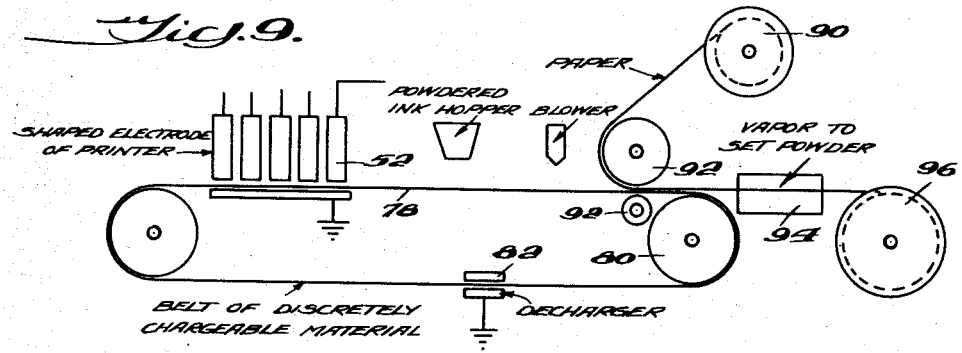

United States Patent Office 3,072,046
Patented Jan. 8, 1963

3,072,046
HIGH-SPEED PRINTER FOR COMPUTERS
Stanley Arthur Shull, 305 Memorial Drive, MIT,
Cambridge 39, Mass.
Filed May 27, 1959, Ser. No. 816,281
15 Claims. (Cl. 101—93)

The invention relates to a mechanism for controlling devices in accordance with varying signals. In the form shown, it is directed to a mechanism for printing the output of a computer, although this is merely a specific application, other uses being also contemplated.

In present computers, one of the drawbacks lies in the relative slowness of the output printing mechanism. As a result, the computer itself is often idle for a substantial part of the time, or a buffer and/or an intermediate output storage device, such as a magnetic tape, must be employed.

The primary object of the present invention is to provide an arrangement for high-speed printing of the output of a calculating or computing machine, operating sufficiently rapidly to eliminate or at least to reduce substantially the inactive time of the computer and eliminate or substantially reduce the need for a buffer device between the computer or intermediate storage and the printer.

A further object of the invention is to provide a device of this type which is composed of relatively simple and readily available parts.

An additional object of the invention is to provide an arrangement of this type which is useful for controlling differing operations on a relatively moving member, in respect to control signals of any suitable type.

Further objects and advantages of the invention will appear more fully from the following description, especially when taken in conjunction with the accompanying drawings which form a part thereof.

In the drawings:

FIG. 1 shows the wiring diagram and connections of a device embodying the invention;

FIG. 2 is a diagram of one of the elements of the column gate;

FIG. 3 shows the circuit of an individual printer;

FIG. 4 is a bottom plan view of the printers;

FIG. 5 shows the printing operation on successive steps from left to right;

FIG. 5a shows the numbers being printed in the example of FIG. 5;

FIGS. 6 and 7 show diagrammatically modifications of the invention.

FIG. 8 shows diagrammatically another form of the invention;

FIG. 9 shows the printing mechanism of the device of FIG. 8;

FIGS. 10 and 11 are explanatory diagrams; and

FIG. 12 shows in cross-section one of the electrodes.

The invention as herein disclosed is related to an electronic computer of any well-known type which emits a series of coded signal groups which are to be printed serially. Such a computer could have a binary output and would give, for example, for the sequence 14301 the set of signals 001; 100; 011; 000; and 001.

The invention, as disclosed herein for the sake of simplicity, covers only the digits 1 to 5 and prints a three- or five-column line. Obviously, however, the invention is intended to be applicable to the digits from zero to nine, arranged in any number of columns, or to combinations of letters, digits or other symbols, or to any other type of mechanism so operated and intended to be controlled in response to signals.

The invention, in general, covers the arrangement of suitable elements in columns and rows, all the elements of any row normally, in the case of a printer, being alike. At least as many rows are provided as there are different signals or signal groups coming from the computer or other input source. The number of columns is determined by the number of numerals, letters, or other symbols to be printed serially across the tape or other receiving element, or by the number of columns in which particular operations are to be performed. The tape or other element to be operated on is moved past the printing elements in the direction of the columns, while the signals corresponding to the printing elements of any given row are stored for a length of time equal to that required for a point on the tape to come opposite that particular row from a predetermined point, and the printing elements or the like are then caused to operate so as to print a particular symbol on the tape or to cause some other type of operation.

This storing is preferably accomplished by providing a shifting register having a number of stages each composed of a plurality of sections, the number of stages in one form of the invention varying in the registers assigned to the different rows, and there being a shifting register section for each output matrix location, together with mechanism for conducting the signals to the proper shifting register.

Referring now to the drawings, FIG. 1 shows a system embodying the invention. The input rate detector 10, which is connected to computer 11, through tape feed control 12 regulates the motor 14 driving the tape feed roll 16 to shift the tape 18. In the specific embodiment shown, this control will shift the tape by one step after each set of five signal groups emitted by the computer.

The input signal is also fed to a decoder 20. This decoder emits signals to one of the lines 22, depending on the value of the digit representing the coded output signal. The lines of the decoder feed in parallel the different lines of a column gate 24, one element of which is shown in detail in FIG. 3. A gate pulse generator 26 controlled by each input signal successive'y and cyclically controls the five different elements of the column gate 24, so as to render these elements successively conductive as successive signal groups are received as input. Thus, if there is an input signal corresponding to the digit 4 while the column index is set at the third column, the decoder will connect this signal to line (4) of wires 22 and the central group of the column gate being conductive will furnish a signal only to the central stack of the fourth group of the shift register 28.

For each row there are one or more shifting register stages 28b each composed of as many elements 28a as there are columns. For one row, there is a single stage, for the next, two stages, then three, four and five. These shifting registers are well known and, for example, are disclosed at pages 425 to 427 of a book "Pulse and Digital Circuits," Millman and Taub, New York, 1956, McGraw-Hill.

Shifting register 28 is controlled by a series of markings 25 on tape 18 spaced apart by one line space. These marks are detected by a photocell 27 which controls a driving pulse generator 29. At each movement of the tape through one line space, generator 29 transmits a pulse to shifting register 28. Thus, after each movement of the paper through one line space, a signal which has been supplied to the first unit of one of the shifting register groups will be passed on to the next unit, or emitted from the last unit.

Each set of shifting register units has its output connected to one of the printers 30 which constitute the output matrix. One of the printers is shown in detail in FIG. 4 and consists in this instance of a suitable source of current 32 connected by tube 34 to sparking points 36 arranged in the shape of the members to be printed. Wires 38 from shift register 28 are so arranged as to render the tube 34 conductive whenever a signal passes to it, thus allowing current to pass from points 36 to conductive plate 48 over which a suitably sensitive tape is being passed, and marking the tape with the desired pattern.

FIG. 5 shows a tape on which the numerals of FIG. 5a are to be printed in the successive stages of a printing operation. The input signal to the decoder corresponding to the first digit 1 will energize the output line 22 (1). At the same time, gate pulse generator 26 has rendered column index section 24 (A) conductive. This will then energize the section 1A of shifting register 28. In a similar way, sections 3B, 4C and 1D will be energized.

At the end of this operation, a signal from the driving pulse generator 29 actuates all the shifting register stages 28, so that the signals stored in the first stage of each will be shifted. This will cause sections 1A and 1D to emit the signal which will then actuate printing members 1A and 1D to print the numbers on the tape. At the same time, the signal stored on sections 3B and 4C will be shifted to the corresponding sections of the second stage. The tape is then moved one line space.

The next number now energizes in shifting register 28 sections 2A, 5B, 2D and 3E. The tape is moved one space. Actuation of the shifting register will now cause all the stored signals to move down one stage in the set, but no printing takes place since no signal has reached the last section of any shifting register. The next digit energizes shifting register sections 1A, 3C, 1D and 5E. When the shifting register is now actuated, sections 3B, 2A, 2C, 2D, 1A and 1D emit signals to the corresponding printers, and print these numbers in the proper columns and rows on the tape. At the next operation, sections 4A and 3E emit signals and cause printing. Next, sets 3C and 2E; next, sets 5B and 3D; next, sets 5E, 4C and 3A; and next, sets 5A, 4C, 4D, and 4E.

In FIG. 5a, the numbers below the columns indicate first the digit being printed and secondly the row in which such digit is being printed in that particular print cycle.

FIG. 3 shows one of the elements of the column index 24. This consists of a group of tubes 42 whose grids are connected in parallel by wires 44 to shift register 26. Such a system is arranged to impose such a signal on these tubes as to render them conducting only when the corresponding wire 24 is energized.

FIG. 4 shows in bottom plan view the different printing elements, from which it will be noted that there are five rows each containing the same numeral, one on each column.

FIG. 6 shows how the invention is applicable to printing on a tape or sheet where the printing is to be read longitudinally of the direction of movement at least in part. Here there are three columns 40 composed of numbers and letters, the symbols being arranged crosswise of the columns, as well as three or more sets of columns 42 for printing in the manner shown in FIG. 1. This arrangement could be used for printing bank statements under the control of a magnetic tape or the like, the columns 40 printing the name and address of the depositor along the side of the statement while the columns 42 print deposits, withdrawals, balances and the like.

In the form of FIG. 7, there are a different number of stages 44 for each row, each stage being composed of five sections 46, the different sections of each stage each representing a different column. In this arrangement, the signals imposed at the top of each stage or group of stages for any row are successively transferred from one section to the next and from stage to stage until they are stored in the last or lowest stage, the sections of which are each connected to one of the printers. The tape 48 is moved in the direction shown by the arrow.

The different signals are supplied each to a different row; as, the 5's to the left-hand row, then 4's 3's, 2's and 1's. At the end of each cycle of signals corresponding to a line, all the shifting register sections of the last or lowest stage of each row are actuated simultaneously to energize the printers.

It will be clear that, given the sequence 51423, the digit 5 will be supplied to the first section of the top stage and, as each successive digit signal is applied, will be shifted down by one section until, when the sequence has been completed, the lowest section of the first stage of row 5 will store a signal. Likewise, the fourth (from the top) section of the 1 row, the third of the 4 row, the second of the 2 row and the top section of the 3 row will store signals.

When now all the sections of the last stage of each row are actuated, the printer in the fourth section (from the top) in the 1 row will be actuated to print a 1. During each succeeding set of signals corresponding to a line, the remaining signals will each be shifted to the corresponding sections of the next lower stage, and, when they reach the last stage, will be printed in the proper column.

In the form of FIGS. 8 to 11, the decoder is not necessary and the number of shifting register units required is much lower for larger numbers of symbols.

In this form, the signals emitted will be assumed to represent in the first column the successive digits 55331341541, that is, the set of signals from the computer will be 101; $n$; $n$; 101; $n$; $n$; 011; $n$; $n$; 011; $n$; $n$; 001; $n$; $n$; 011; $n$; $n$; 100; $n$; $n$; 001; $n$; $n$; 101; $n$; $n$; 100; $n$; $n$; 001; $n$; $n$. The letters $n$ here each represent a similar binary system for each of the second and third columns. However, as the operation is the same for all columns, only one specific example applicable to a single column is given.

The device here shown has three printing columns 50A, 50B, 50C, each composed of five electrodes 52 each having the cross-section of the numerals 1 to 5. Through printing gates 54 and cycling switch 56 the electrodes of each column are successively connected to the output of a comparator 58.

The computer 10 feeds each signal to all the units of column gate 60, there being as many units in this gate as there are columns of electrodes, and then to shifting registers 62A, 62B, 62C. A cycling switch 64 successively connects the units A, B and C of the column gate to an output signal from the computer so as to render them conductive in proper synchronism with the computer output, so that signals 101, 101, 011 etc. will be fed to register 62A, while signals $n$ will be fed to registers 62B, 62C.

Each register has as many stages as there are electrodes in each column, and as many elements in each stage as there are digits in each binary output signal of the computer. The first or input stage of each register is connected through section 66–1 of rewrite gate 66 to the column gate 60. The remaining stages of the rewrite gate are connected to the other stages 2 to 5 of the register. The input of these four stages of the rewrite gate is connected successively through cycling switch 68 to a comparator 70.

Comparator 70 is also connected through cycling switch 72 and reading gate 74 successively to the various stages of the registers. Rewrite gate is always open to one stage lower of the register than the reading gate, except that, when the reading gate is open to the lowest stage, the rewrite gate is open between column gate 60 and the first stage of the register.

A modifier 76 connected to comparator 70 sets therein in sequence a complete set of signals corresponding to the signals of each row of the printing mechanism. That is, in this case, the signals would be 101; 100; 011; 010; 001.

The structure and operation of the comparator is such that, if the signal read from any stage of the register 62 agrees with the number to which the comparator is set by modifier 76, an impulse is sent through switch 56 and printing gate 54 to the electrode of the corresponding location in the proper column. If, however, the compared numbers disagree, the comparator feeds the number which it has received from the register back through the rewrite gate 60 to the next lower stage of the register.

When the reading gate reads the last stage of the register, the only number which can be present is one which agrees with the comparator and will therefore be printed, since any other number will have agreed in one of the earlier stages. Therefore there is no possibility of the feeding of a number back through the rewrite gate to the first stage, and the first stage of the rewrite gate can therefore be used to permit the input from the computer to enter the first stage of the register.

The register elements may be conventional ferrite cores which are magnetized and discharged in known ways, the reading of a signal to the comparator acting to clear that stage of the register from which the signal is read.

The cycling switches 56, 68, 72 are operated in synchronism with the computer so as to connect comparator 70 to the reading, rewrite and printing gates of each column in turn. These switches maintain such a connection through a comparing cycle for each register in turn. Such a cycle will now be described.

Let us assume a condition in which the five stages of shifting register 62A have the codes 101, 101, 011, 011, 001 impressed therein (the following explanation will show how this can come about). Now the reading gate register starts at the bottom of the shifting register, and feeds the signal 101 in the lowest row to the comparator 70. This is set by the modifier 76 at 101, and therefore agreement exists and an impulse is sent to the upper member (5) of column A of electrodes 50. Reading gate 74 now transmits the signal 101 in row A4 to the comparator, which however is now set at 100. There is disagreement, and the signal is returned through the rewrite gate 66 to stage A5 (the rewrite gate being always one step behind the reading gate). Next 011 in stage A3 agrees with 011 in the comparator, and an impulse is sent to electrode (3) in column A. Next, 011 in stage A2 does not agree with 010 in the comparator, and is therefore shifted to stage A3. Finally, 001 in stage A1 agrees with the comparator and energizes electrode (1) of column A.

Cycling switches now connect shifting registers B and C and printing columns B and C successively to the comparator in the same manner, and then restore the connection to column A. When this is done, the next signal (say 011) emitted from the computer is fed through the upper element of rewrite gate 66 to stage A1 of the shifting register.

Now reading gate 74 repeats, starting from stage A5. It will print the 101 which is now in A5 and the 011 which is in A3 (A2 and A4 being empty), and will transfer the 011 in A1 to A2.

FIG. 11 shows the succeeding operations. In this figure, the underlined signals are those which agree and are printed, while the arrows show the transfer from one stage to the next lower stage. FIG. 12 shows how the shaped charges are successively impressed on the belt 78 (to be described below) in column A, the vertical lines from left to right representing the successive conditions of the belt.

Endless belt 78 of discretely chargeable material is passed beneath the electrodes 52 by suitable driving rollers 80, the belt being shifted by one space after each set of three cycles for the three columns. This belt thus receives charged shaped areas in the proper locations. The belt can be freed of its charges on its return run by a decharger 82. A suitable powdered ink or pigment which will adhere to the charged areas is dusted on the belt by hopper 84, and the ink is removed from the uncharged areas by blower 86. A tape 88, formed of a suitable paper is unrolled from reel 90 and pressed between pressure rolls 92 against the belt, taking the powdered ink from the belt. The paper then passes through chamber 94 where it is exposed to a vapor or heat which sets the ink on the paper, and may then be cut off or rolled on reel 96.

While I have described the invention in connection with a printing mechanism, it is apparent that the system may be used for many other purposes. For instance, if a printed circuit board is being passed beneath a group of rows and columns, and different numbers of resistance elements are to be placed in openings in the board, the printing elements may be replaced by mechanisms for depositing such different numbers of elements. The arrangement might then operate in response to signals from a prepared tape or from any other control means.

The invention might also be used to control embroidering machines for the purpose of embroidering words or numbers in mixed colors either on a garment or on a tape, or for embroidering initials or patterns on any type of fabric.

This application is a continuation-in-part of my application Serial No. 670,953, filed July 10, 1957, now abandoned.

While I have described herein some embodiments of my invention, I wish it to be understood that I do not intend to limit myself thereby except within the scope of the claims hereto or hereinafter appended.

I claim:

1. An arrangement for controlling a plurality of elements arranged in columns and rows, to operate on a member moved past such elements in the direction of such columns, all the elements in each row performing the same function, and the elements in different rows performing different functions, in response to signals differing for each of such functions and being produced in sets each signal of which corresponds to a different column, there being at least as many rows as there are different functions, comprising a plurality of storing devices one connected to each of the elements, the storing devices for each row storing signals for different periods of time which vary with the distance through which the member moves from a predetermined point in order to come opposite the elements in the various rows, means controlled by release of a signal from a storing device to actuate the element to which it is connected, a decoder having outlets each corresponding to one of said functions and comprising means to determine the function of a signal supplied thereto and to supply a control signal to the proper outlet, means for connecting each outlet of the decoder to all the storing devices of the corresponding row, and means controlled in synchronism with the successive signals of each set for successively rendering the connecting means operative so as to supply each control signal to the storing device of the proper column and row.

2. In combination, a plurality of elements arranged in columns and rows, means to move a member to be operated on by said elements step by step through the distance between successive rows at each step past the elements in the direction of the columns, all the elements in each row performing the same function, and the elements in different rows performing different functions, in response to signals differing for each of such functions and being produced in sets each signal of which corresponds to a different column, there being at least as many rows as there are different functions, comprising a plurality of shifting registers one connected to each of the elements, the registers for each row having the same number of stages, the number of stages successively increasing in the direction of movement of the member, means controlled by release of a signal from a shifting register to actuate the element to which it is connected, a decoder having outlets each corresponding to one of said functions and comprising means to determine the function of a signal supplied thereto and to supply a signal to the proper outlet, means for connecting each outlet of the decoder to the first stage of all the shifting registers of the corresponding row, and means controlled in synchronism with the successive signals of each set for successively rendering the connecting means operative so as to supply each signal to the shifting register of the proper column and row, and means controlled in synchronism with the sets of signals for actuating all of the shifting registers to advance them by one stage and for actuating said moving means to move the member by one step.

3. In combination, a plurality of elements arranged in columns and rows, means to move a member to be operated on by said elements step by step through the distance between successive rows at each step past the elements in the direction of the columns, all the elements in each row performing the same function, and the elements in different rows performing different functions, in response to signals differing for each of such functions and being produced in sets each signal of which corresponds to a different column, there being at least as many rows as there are different functions, comprising a plurality of shifting registers one connected to each of the elements, the registers for each row having the same number of stages, the number of stages successively increasing in the direction of movement of the member, means controlled by release of a signal from a shifting register to actuate the element to which it is connected, a decoder having outlets each corresponding to one of said functions and comprising means to determine the function of a signal supplied thereto and to supply a signal to the proper outlet, a plurality of connections from each outlet of the decoder to the first stages of all the shifting registers of the corresponding row, and means controlled in synchronism with the successive signals of each set for successively rendering the connecting means conductive so as to supply each signal to the shifting register of the proper column and row, and means controlled in synchronism with the sets of signals for actuating all of the shifting registers to advance them by one stage and for actuating said moving means to move the member by one step.

4. In combination, a plurality of elements arranged in columns and rows, means to move a member to be operated on by said elements through distances equal to the space between successive rows past the elements in the direction of the columns, all the elements in each row performing the same function, and the elements in different rows performing specific functions, in response to signals differing for each of said functions, there being at least as many rows as there are different functions, comprising shifting registers, each shifting register having at least one stage, each stage being composed of as many shifting register sections as there are columns, the number of stages in each shifting register being equal to the number of spaces through which the member must travel from a predetermined point to come opposite the elements of the corresponding row, means operative in synchronism with the signals to apply a signal to the corresponding column section of a first stage, means operated in synchronism with the movement of the member to shift a signal imposed on any shifting register section to the corresponding column section of the next stage and to release signals in parallel from the last stage upon movement of the member by one space and means controlled by release of a signal from a shifting register section of the last stage to actuate the element to which it is connected.

5. A printing device comprising a plurality of printing members arranged in as many columns as the number of symbols to be serially printed and at least as many rows as there are different symbols, means to feed a tape past said printing members, the printing device being operable in response to sets of signals each signal of which set corresponds to a different column, a plurality of storing devices one connected to each of the printing members, the storing devices for each row storing signals for different periods of time which vary with the distance through which the tape moves from a predetermined point in order to come opposite the printing members in the various rows, means controlled by release of a signal from a storing device to actuate the printing member to which it is connected, a decoder having outlets each corresponding to one of said functions and comprising means to determine the function of a signal supplied thereto and to supply a signal to the proper outlet, means for connecting each outlet of the decoder to all the storing devices of the corresponding row, and means controlled in synchronism with the successive signals of each set for successively rendering the connecting means operative so as to supply each signal to the storing device of the proper column and row.

6. A printing device comprising a plurality of printing members arranged in as many columns as the number of symbols to be serially printed and at least as many rows as there are different symbols, means to feed a tape past said printing members step by step through the distance between successive rows at each step, all the printing members of each row representing the same signal, the printing device being operable in response to sets of signals each signal of which set corresponds to a different column, a plurality of shifting registers one connected to each of the printing members, the registers for each row having the same number of stages, the number of stages successively increasing in the direction of movement of the member, means controlled by release of a signal from a shifting register to actuate the printing member to which it is connected, a decoder having outlets each corresponding to one of said functions and comprising means to determine the function of a signal supplied thereto and to supply a signal to the proper outlet, means for connecting each outlet of the decoder to the first stage of all the shifting registers of the corresponding row, and means controlled in synchronism with the successive signals of each set for successively rendering the connecting means operative so as to supply each signal to the shifting register of the proper column and row, and means controlled in synchronism with the sets of signals for actuating all of the shifting registers to advance them by one stage and for actuating said moving means to move the tape by one step.

7. A printing device comprising a plurality of printing members arranged is as many columns as the number of symbols to be serially printed and at least as many rows as there are different symbols, means to feed a tape past said printing members step by step through the distance between successive rows at each step, all the printing members of each row representing the same signal, the printing device being operable in response to sets of signals each signal of which set corresponds to a different column, a plurality of shifting registers having sections one connected to each of the printing members, the registers for each row having the same number of stages, the number of stages successively increasing in the direction of movement of the member, means controlled by release of a signal from a shifting register to actuate the printing member to which it is connected, a decoder having outlets each corresponding to one of said functions and comprising means to determine a signal to the proper outlet, a plurality of connections from each outlet of the decoder to the first stages of all the shifting registers of the corresponding row, means controlled in synchronism with the successive signals of each set for successively rendering the connecting means conductive so as to supply each signal to the shifting register of the proper column and row, and means controlled in synchronism with the sets of signals for actuating all of the shifting registers to advance them by one stage and for actuating said moving means to move the tape by one step.

8. An arrangement for controlling a plurality of elements arranged in columns and rows, to operate on a member moved past such elements in the direction of such columns, all the elements in each row performing the same function, and the elements in different rows performing different functions, in response to signals differing for each of such functions and being produced in sets each signal of which corresponds to a different column, there being at least as many rows as there are different functions, comprising a plurality of storing devices each having as many successive stages as there are rows, there being as many storing devices as there are columns, a source of signals, means connecting the source to all the storing devices, means controlled in synchronism with the successive signals of each set for successively rendering the connecting means operative so as to supply each control signal to the storing device of the proper column, means for successively comparing the signals from the source stored in each stage of a storing device with signals which change for each stage, means responsive to disagreement between the compared signals to impose the source signal on the next succeeding stage, means connecting the comparing means successively to each of the elements of the corresponding column, and means responsive to agreement between the compared signals to energize said connecting means so as to actuate the element to which the comparing means is connected.

9. An arrangement for controlling a plurality of elements arranged in columns and rows, to operate on a member moved past such elements in the direction of such columns, all the elements in each row performing the same function, and the elements in different rows performing different functions, in response to signals differing for each of such functions and being produced in sets each signal of which corresponds to a different column, there being at least as many rows as there are different functions, comprising a plurality of storing devices each having as many successive stages as there are rows, there being as many storing devices as there are columns, a source of signals, means connecting the source to all the storing devices, means controlled in synchronism with the successive signals of each set for successively rendering the connecting means operative so as to supply each control signal to the storing device of the proper column, a comparator, means for supplying to said comparator a series of signals corresponding to the different functions, means for successively feeding to the comparator the signals stored in the stages of a storing device, means connecting the comparator successively to each of the elements of one of the colums, said comparator including means responsive to disagreement between the compared signals to impose the source signal on the next succeeding stage, and means responsive to agreement between the compared signals to energize said connecting means so as to actuate the element to which the comparing means is connected.

10. In combination, a plurality of elements arranged in columns and rows, means to move a member to be operated on by said elements step by step through the distance between successive rows at each step past the elements in the direction of the columns, all the elements in each row performing the same function, and the elements in different rows performing different functions, in response to signals differing for each of such functions and being produced in sets each signal of which corresponds to a different column, there being at least as many rows as there are different functions, comprising a plurality of shifting registers each having as many stages as there are rows, there being as many registers as there are columns, a source of signals, means connecting the source to all the shifting registers, means controlled in synchronism with the successive signals of each set for successively rendering the connecting means operative so as to supply each signal to the shifting register of the proper column, means for successively comparing the signals from the source stored in each stage of a shift register with signals which change for each stage, means responsive to disagreement between the compared signals to impose the source signal on the next succeeding stage, means connecting the comparing means successively to each of the elements of the corresponding column, and means responsive to agreement between the compared signals to energize said connecting means so as to actuate the element to which the comparing means is connected.

11. A printing device comprising a plurality of printing members arranged in as many columns as the number of symbols to be serially printed and at least as many rows as there are different symbols, means to feed a tape past said printing members, the printing device being operative in response to sets of signals each signal of which set corresponds to a different column, a plurality of storing devices each having as many successive stages as there are rows, means connecting the computer to all the storing devices, means controlled in synchronism with the successive signals of each set for successively rendering the connecting means operative so as to supply each control signal to the storing device of the proper column, means for successively comparing the signals from the computer stored in each stage of a storing device with signals which change for each stage, means responsive to disagreement between the compared signals to impose the source signal on the next succeeding stage, means connecting the comparing means successively to each of the printing elements of the corresponding column, and means responsive to agreement between the compared signals to energize said connecting means so as to actuate the element to which the comparing means is connected.

12. A printing device comprising a plurality of printing members arranged in as many columns as the number of symbols to be serially printed and at least as many rows as there are different symbols, means to feed a tape past said printing members, the printing device being operative in response to sets of signals each signal of which set corresponds to a different column, a plurality of shifting registers each having as many stages as there are rows, there being as many registers as there are columns, a source of signals, means connecting the source to all the shifting registers, means controlled in synchronism with the successive signals of each set for successively rendering the connecting means operative so as to supply each signal to the shifting register of the proper column, means for successively comparing the signals from the source stored in each stage of a shift register with signals which change for each stage, means responsive to disagreement between the compared signals to impose the source signal on the next succeeding stage, means connecting the comparing means successively to each of the elements of the corresponding column, and means responsive to agreement between the compared signals to energize said connecting means so as to actuate the element to which the comparing means is connected.

13. A shifting register mechanism comprising a plurality of successive storing stages, one of said stages being adapted to receive a signal from a source, a comparator, means to supply to the comparator successively a plurality of different comparison signals, the number of such different comparison signals being equal to the number of stages, means for successively supplying the signals stored in each stage to the comparator for comparison with a comparison signal therein, means responsive to disagreement between the compared signals to impose the source signal on the next succeeding stage, said comparator having an output, and means responsive to agreement between the compared signals to energize said output.

14. An arrangement for controlling a plurality of elements arranged in columns and rows, means to move a member past such elements in the direction of such columns and to maintain said member in a position to be operated on simultaneously by the elements of all the rows, the elements in different rows and columns performing specific functions, in response to signals differing for each of such functions and applicable to different columns, there being at least as many rows as there are different functions in a column, comprising means to distribute such signals to each column in accordance with the column position of the signal and each to an element corresponding to the function, means to store the signals through time which vary with the distance through which the member moves from a predetermined point in order to come opposite the corresponding elements in the various rows, and means to actuate the elements at the end of such periods, all parts of said elements being normally stationary with respect to the member and said elements comprising means operable in a stationary position to affect the member.

15. An arrangement for controlling a plurality of elements arranged in columns and rows, to operate on a member moved past such elements in the direction of such columns, all the elements in each row performing the same function, and the elements in different rows performing different functions, in response to signals differing for each of such functions and being produced in sets each signal of which corresponds to a different column, there being at least as many rows as there are different functions, comprising a plurality of storing devices each having as many successive stages as there are rows, there being as many storing devices as there are columns, a source of signals, means connecting the source to all the storing devices, means controlled in synchronism with the successive signals of each set for successively rendering the connecting means operative so as to supply each control signal to the storing device of the proper column, means for successively comparing the signals from the source stored in each stage of a storing device with signals which change for each stage, means responsive to disagreement between the compared signals to impose the source signal on the next succeeding stage, means connecting the comparing means successively to each of the elements of the corresponding column, and means responsive to agreement between the compared signals to energize said connecting means so as to actuate the element to which the comparing means is connected, all parts of said elements being normally stationary with respect to the member and said elements comprising means operable in a stationary position to affect the member.

References Cited in the file of this patent

UNITED STATES PATENTS

| | | |
|---|---|---|
| 2,692,551 | Potter | Oct. 26, 1954 |
| 2,776,618 | Hartley | Jan. 8, 1957 |
| 2,799,222 | Goldberg | July 16, 1957 |
| 2,811,103 | Devol | Oct. 29, 1957 |
| 2,841,461 | Gleason | July 1, 1958 |
| 2,863,712 | Potter | Dec. 9, 1958 |
| 2,873,666 | Stiefel | Feb. 17, 1959 |
| 2,874,633 | Goldberg | Feb. 24, 1959 |
| 2,874,634 | Hense | Feb. 24, 1959 |
| 2,935,016 | Miller | May 3, 1960 |